(12) United States Patent
Zhang

(10) Patent No.: US 11,599,207 B2
(45) Date of Patent: Mar. 7, 2023

(54) MULTIFUNCTION MOUSE

(71) Applicant: Kai Zhang, Hunan (CN)

(72) Inventor: Kai Zhang, Hunan (CN)

( * ) Notice: Subject to any disclaimer, the term of this patent is extended or adjusted under 35 U.S.C. 154(b) by 0 days.

(21) Appl. No.: 17/811,311

(22) Filed: Jul. 8, 2022

(65) Prior Publication Data

US 2022/0342493 A1 Oct. 27, 2022

(30) Foreign Application Priority Data

Jan. 14, 2022 (CN) .......................... 202220105525.1

(51) Int. Cl.
*G06F 3/0354* (2013.01)
(52) U.S. Cl.
CPC ................. *G06F 3/03543* (2013.01)
(58) Field of Classification Search
CPC .................................. G06F 3/03543

USPC .......................................... 345/163
See application file for complete search history.

(56) References Cited

U.S. PATENT DOCUMENTS

2013/0038533 A1* 2/2013 Lo ....................... G06F 3/03543
345/163

FOREIGN PATENT DOCUMENTS

CN 215494941 U * 1/2022

* cited by examiner

*Primary Examiner* — Mark Edwards

(57) ABSTRACT

A computer mouse include a base; a cover assembly releasably secured to the base and including an opening; and a rotational device disposed in the opening to rotatably secure to the base. The rotational device includes a disc-shaped external rotational member including a circular flange on one surface, the circular flange disposed through the opening to rotatably secure to the base, the circular flange having a through hole; and a disc-shaped internal rotational member partially disposed in the through hole.

5 Claims, 8 Drawing Sheets

MULTIFUNCTION MOUSE

FIELD OF THE INVENTION

The invention relates to computer mouse and more particularly to a multifunction mouse.

BACKGROUND OF THE INVENTION

A computer mouse is a hand-held pointing device that detects two-dimensional motion relative to a surface. This motion is translated into the motion of a pointer on a display, which allows a smooth control of the graphical user interface of a computer. A wireless mouse, as another type mouse, may transmit data via radio.

However, people may have sore and stiff muscles after long periods of time of using a typical mouse.

SUMMARY OF THE INVENTION

The invention has been made in an effort to solve the problems of the conventional art including having sore and stiff muscles after long periods of time of using a mouse by providing a multifunction mouse having novel and nonobvious characteristics.

To achieve above and other objects of the invention, the invention provides a computer mouse comprising a base; a cover assembly releasably secured to the base and including an opening; and a rotational device disposed in the opening to rotatably secure to the base.

Preferably, the rotational device includes a disc-shaped external rotational member including a circular flange on one surface, the circular flange disposed through the opening to rotatably secure to the base, the circular flange having a through hole; and a disc-shaped internal rotational member partially disposed in the through hole.

Preferably, the internal rotational member includes a cylindrical projection disposed in the through hole; the base includes a cylindrical protrusion on an end; and the rotational device further comprises a first bearing disposed in the through hole and put on the cylindrical protrusion, and a second bearing disposed in the through hole and put on the cylindrical projection.

Preferably, the circular flange further comprises a toothed outer surface; and the base further comprises a recess around the cylindrical protrusion and at least one steel ball disposed in the recess to rotatably contact the toothed outer surface.

Preferably, the base further comprises a body releasably secured to the cover assembly, and a hollow, cylindrical mounting member on an inner surface of the body; and wherein the rotational device is rotatably secure to the mounting member.

Preferably, further comprises a rotational member including a cylindrical mounting element rotatably, releasably disposed in the mounting member, and a base element.

Preferably, the cover assembly comprises a top member releasably mounted on the base, the top member including the opening; a covering body releasably mounted between the top member and the base, the covering body including a central opening aligned with the opening, a front, left shell, and a front, right shell being a mirror image of the front, left shell.

Preferably, the top member further comprises a plurality of steel protuberances on a bottom, each of the protuberances including a hole; the covering body further comprises a plurality of bossed holes and a plurality of magnets magnetically disposed in the bossed holes respectively; and the covering body includes and the magnets are configured to attract the protuberances when the protuberances are inserted into the bossed holes respectively, thereby magnetically fastening the top member and the covering body together.

Preferably, the covering body further comprises a rear socket and a radio frequency transmitter disposed in the rear socket.

Preferably, further comprises a scroll wheel disposed between the front, left shell and the front, right shell, and rotatably mounted in the covering body.

The computer mouse of the invention has the following advantageous effects in comparison with the prior art: if a user has sore and stiff muscles after long periods of time of using the computer mouse the user may use the finger to rotate the rotational device relative to both the cover assembly and the base. The rotation may stimulate nerves of the brain. Thus, the user may feel a degree of comfort.

The above and other objects, features and advantages of the invention will become apparent from the following detailed description taken with the accompanying drawings

DETAILED DESCRIPTION OF THE INVENTION

Figure 1:
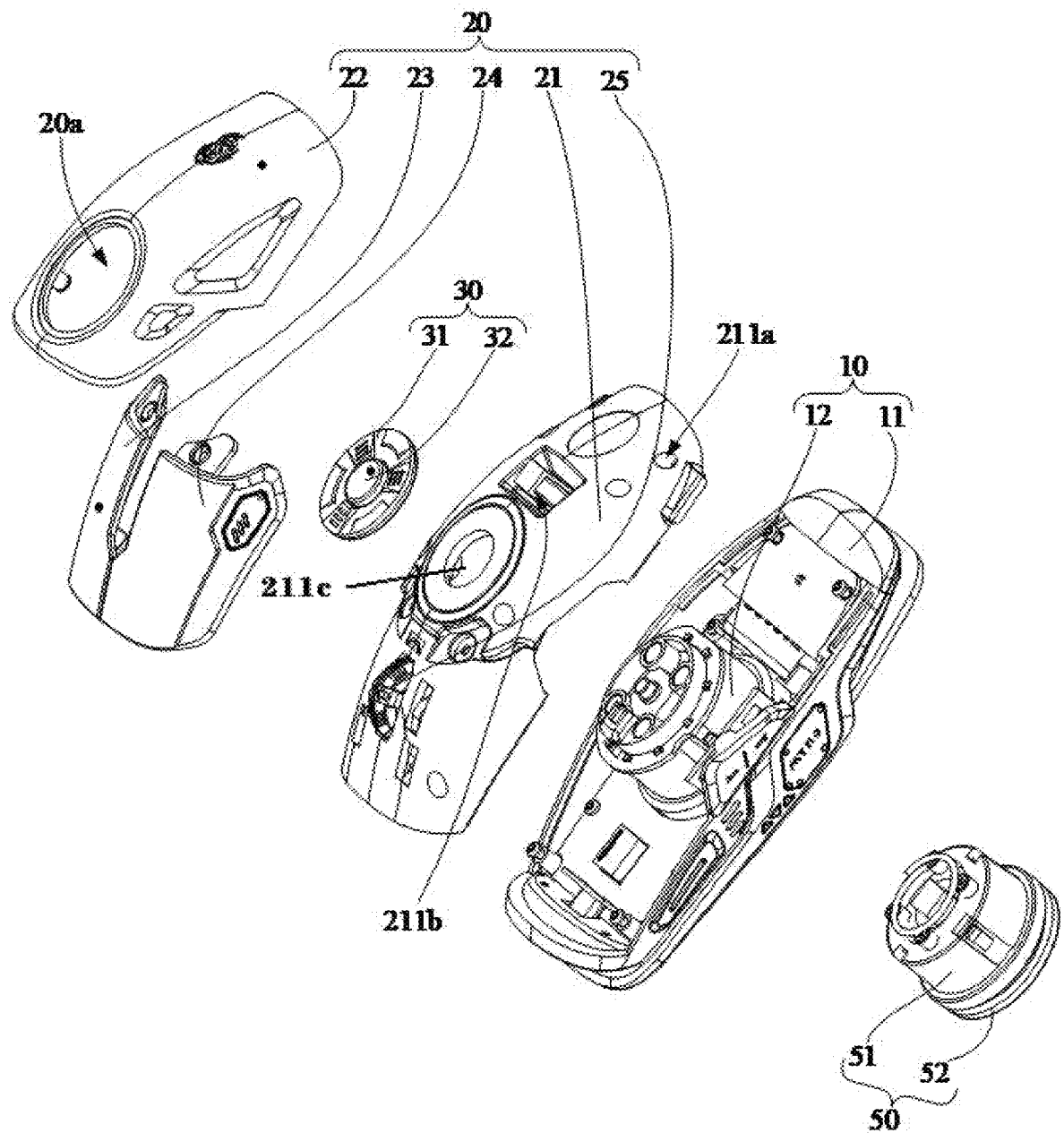
FIG. 1 is an exploded view of a multifunction mouse of a preferred embodiment of the invention.
Figure 2:
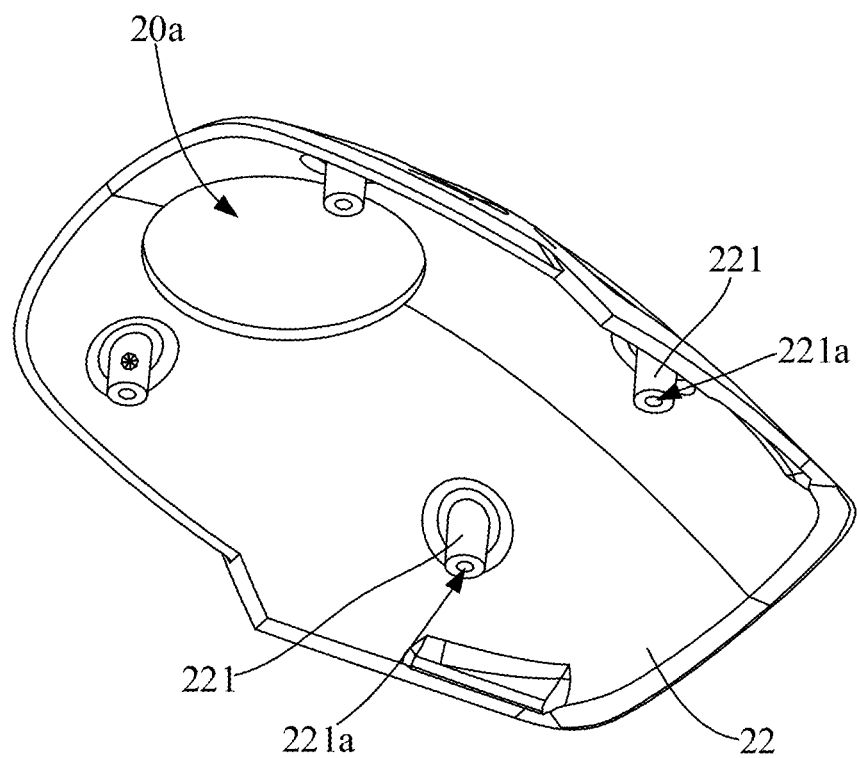
FIG. 2 is a perspective view of the cover.
Figure 3:
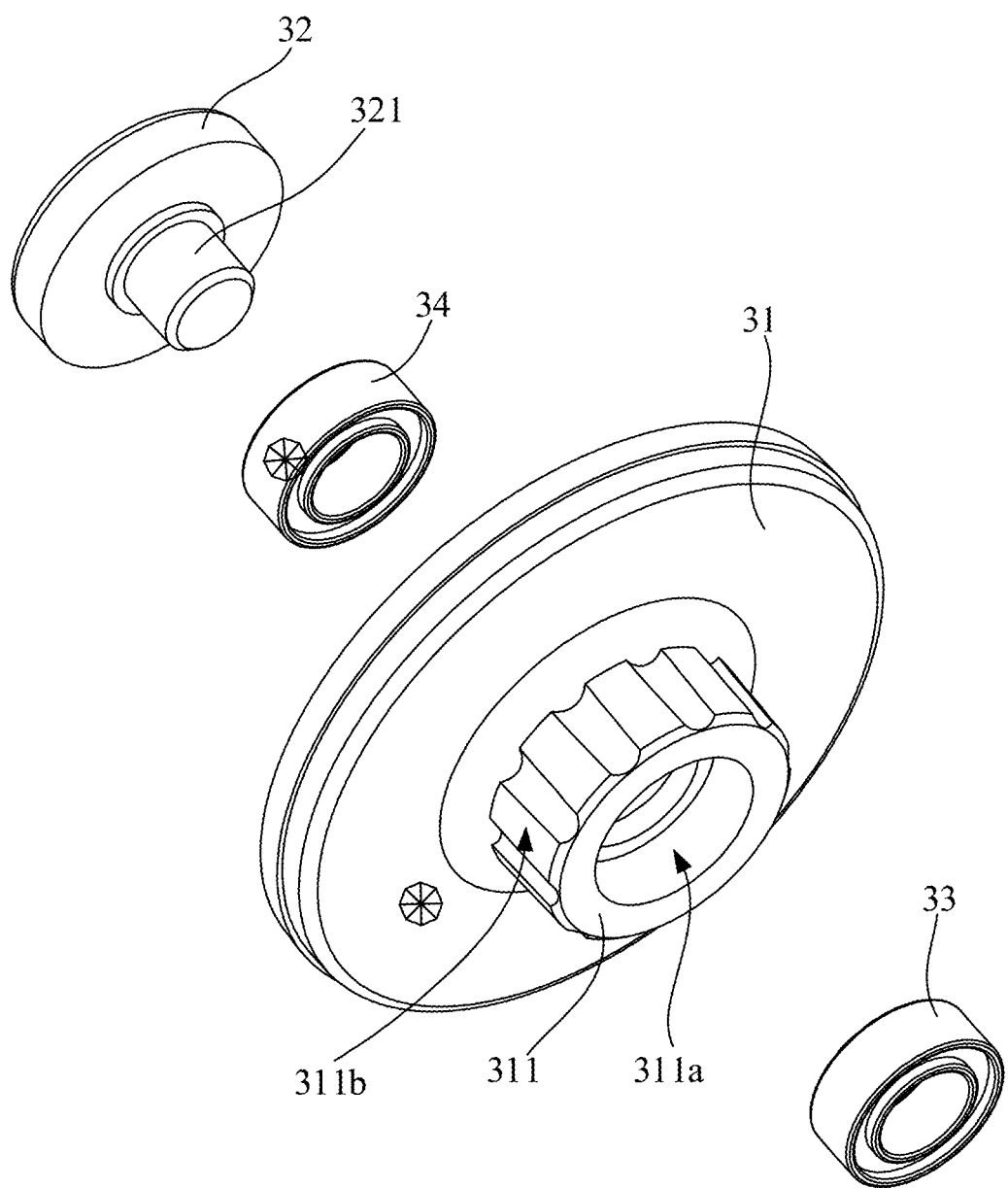
FIG. 3 is an exploded view of the rotational device.
Figure 4A:
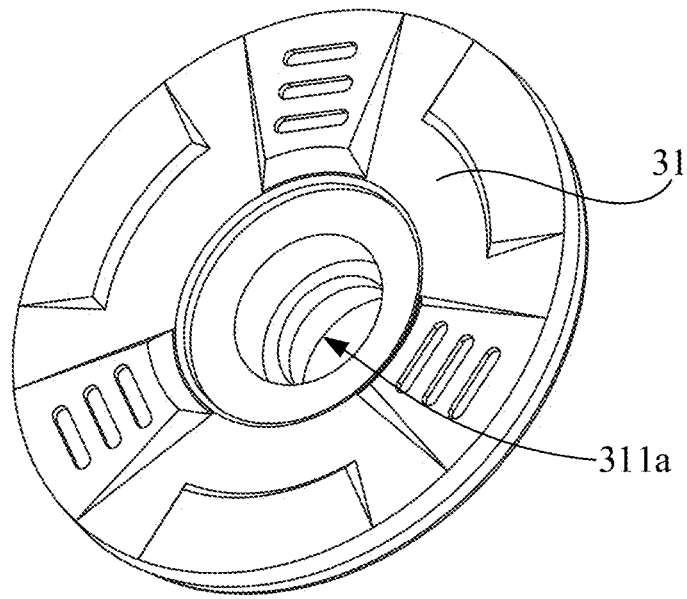
FIG. 4A is a perspective view of the rotational device.
Figure 4B:
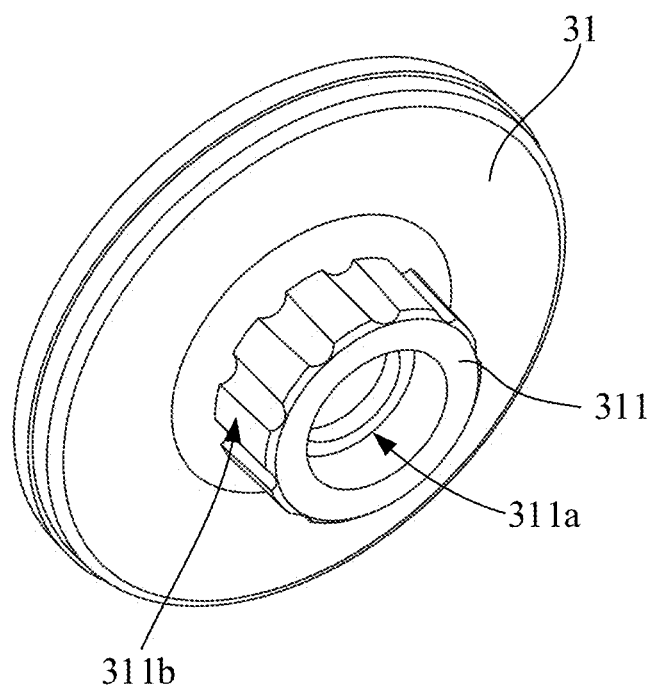
FIG. 4B is another perspective view of the rotational device.
Figure 5:
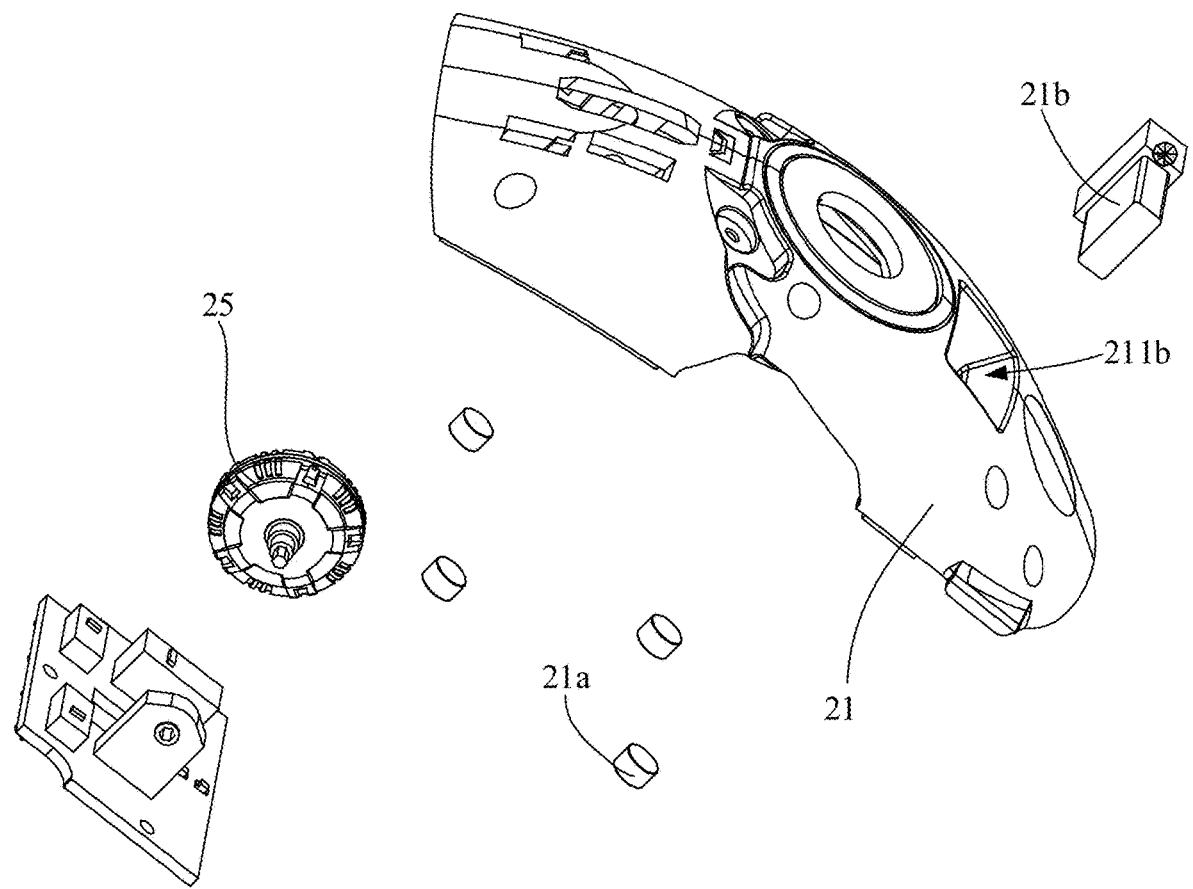
FIG. 5 is an exploded view of the covering body of the rotational device.
Figure 6:
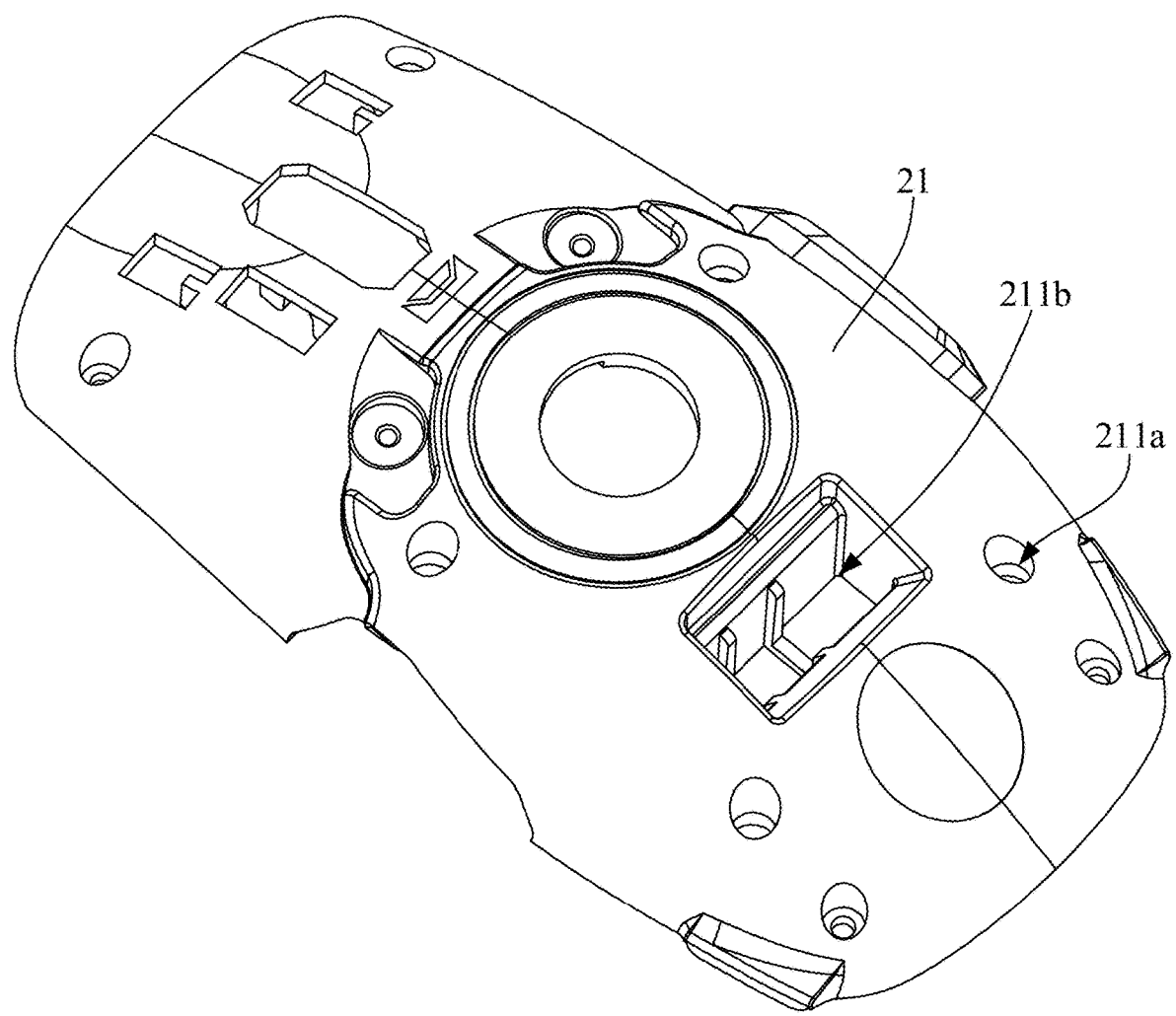
FIG. 6 is a perspective view of the assembled covering body.
Figure 7:
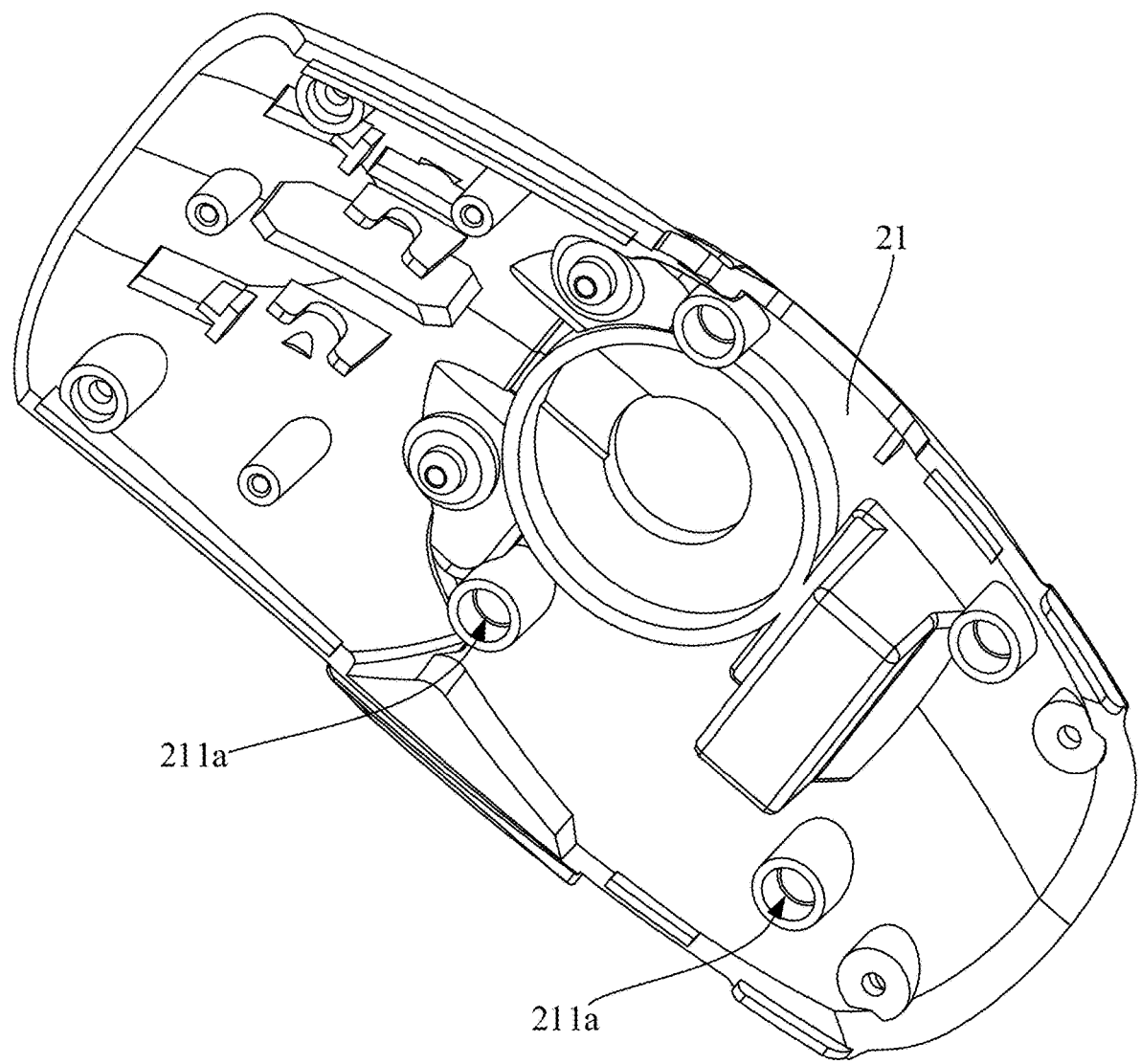
FIG. 7 is another perspective view of the covering body of FIG. 6.
Figure 8:
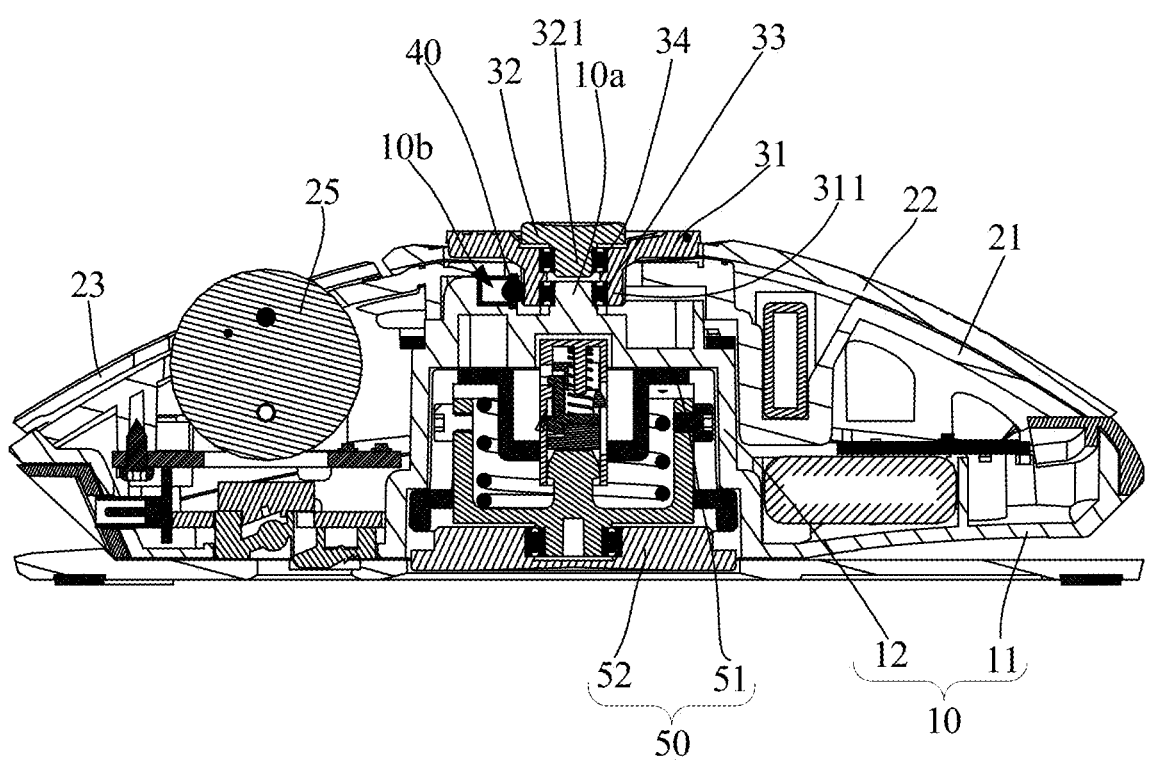
FIG. 8 is a longitudinal sectional view of the multifunction mouse.

Referring to FIGS. 1 to 8, a multifunction mouse in accordance with a preferred embodiment of the invention comprises a base 10, a cover assembly 20 and a rotational device 30 as discussed in detail below.

The base 10 is made of metal and includes a body 11 and a hollow, cylindrical mounting member 12 on an inner surface, the mounting member 12 including a cylindrical protrusion 10a on an end and a recess 10b around the protrusion 10a with at least one steel ball 40 disposed therein.

The cover assembly 20 and the base 10 releasably secured together to form a housing. The cover assembly 20 includes an opening 20a. The rotational device 30 is disposed through the opening 20a into the housing to rotatably secure to the base 10.

In the embodiment, if a user has sore and stiff muscles after long periods of time of using the multifunction mouse the user may use the finger to rotate the rotational device 30 relative to both the cover assembly 20 and the base 10. The rotation may stimulate nerves of the brain. Thus, the user may feel a degree of comfort.

The rotational device 30 includes a disc-shaped external rotational member 31 including a circular flange 311 on one surface, the flange 311 disposed through the opening 20a into the housing to rotatably secure to the base 10, the flange 311 having a through hole 311*a* and a toothed outer surface 311*b* contacting the steel ball 40; a disc-shaped internal rotational member 32 including a cylindrical projection 321 in the through hole 311*a*; a first bearing 33 put on the protrusion 10*a* to contact an inner surface of the flange 311; and a second bearing 34 put on the projection 321 to contact the inner surface of the flange 311. As a result, the rotational device 30 and the base 10 are assembled. The rotational device 30 is configured to rotate about the mounting member 12.

A click can be heard when the user rotates the external rotational member 31. Thus, the user may feel a degree of comfort.

Preferably, both the external rotational member 31 and the internal rotational member 31 have a pattern of different colors so that the use may feel a degree of happiness in using the mouse.

There is further provided with a replaceable rotational member 50 including a cylindrical mounting element 51 rotatably releasably disposed in the mounting member 12, and a base element 52. Preferably, the mounting element 51 and the mounting member 12 are magnetically attached each other.

The cover assembly 20 includes a covering body 21 releasably mounted on the base 10 and including a plurality of bossed holes 211*a* along an edge and a plurality of magnets 21*a* disposed in the bossed holes 211*a* respectively, a rear socket 211*b*, and a central opening 211*c* aligned with the flange 311 so that the flange 311 may pass through the central opening 211*c*, a top member 22 releasably mounted on the base 10 and including the opening 20*a*, a plurality of steel protuberances 221 on a bottom, the protuberance 221 including a hole 221*a* so that the magnet 21*a* may attract the protuberance 221 when the protuberance 221 is inserted into the bossed hole 211*a*, thereby magnetically fastening the top member 22 and the covering body 21 together, a front, left shell 23, a front, right shell 24 being a mirror image of the left shell 23, and a scroll wheel 25 rotatably disposed through a gap between the left shell 23 and the right shell 24. The left shell 23, the right shell 24 and the covering body 21 threadedly secured together. The top member 22, the left shell 23 and the right shell 24 consists of a top of the multifunction mouse. The rotational device 30 is disposed on the top member 22.

Preferably, the scroll wheel 25 is provided with a light-emitting diode (LED) so that it may emit light in operation.

A radio frequency transmitter 21*b* is provided in the socket 211*b* for transmitting information to a receiver which is coupled to a host computer.

While the invention has been described in terms of preferred embodiments, those skilled in the art will recognize that the invention can be practiced with modifications within the spirit and scope of the appended claims.

What is claimed is:

1. A computer mouse, comprising:
a base;
a cover assembly releasably secured to the base and including an opening; and
a rotational device disposed in the opening to rotatably secure to the base;
wherein the rotational device includes a disc-shaped external rotational member including a circular flange on one surface, the circular flange disposed through the opening to rotatably secure to the base, the circular flange having a through hole; and a disc-shaped internal rotational member partially disposed in the through hole.

2. The computer mouse of claim 1, wherein the internal rotational member includes a cylindrical projection disposed in the through hole; the base includes a cylindrical protrusion on an end; and the rotational device further comprises a first bearing disposed in the through hole and put on the cylindrical protrusion, and a second bearing disposed in the through hole and put on the cylindrical projection.

3. The computer mouse of claim 2, wherein the circular flange further comprises a toothed outer surface; and the base further comprises a recess around the cylindrical protrusion and at least one steel ball disposed in the recess to rotatably contact the toothed outer surface.

4. The computer mouse of claim 1, wherein the cover assembly further comprises a top member releasably mounted on the base, the top member including the opening; a covering body releasably mounted between the top member and the base, the covering body including a central opening aligned with the opening, a front, left shell, and a front, right shell being a mirror image of the front, left shell; and
wherein the top member further comprises a plurality of steel protuberances on a bottom, each of the steel protuberances including a hole;
wherein the covering body further comprises a plurality of bossed holes and a plurality of magnets magnetically disposed in the bossed holes respectively; and
wherein the magnets are configured to attract the steel protuberances when the steel protuberances are inserted into the bossed holes respectively, thereby magnetically fastening the top member and the covering body together.

5. The computer mouse of claim 4, wherein the covering body further comprises a rear socket and a radio frequency transmitter disposed in the rear socket.

* * * * *